J. AMATO & A. PARRIS.
BOTTLE COVER AND GRIP.
APPLICATION FILED APR. 10, 1915.
1,177,562.
Patented Mar. 28, 1916.
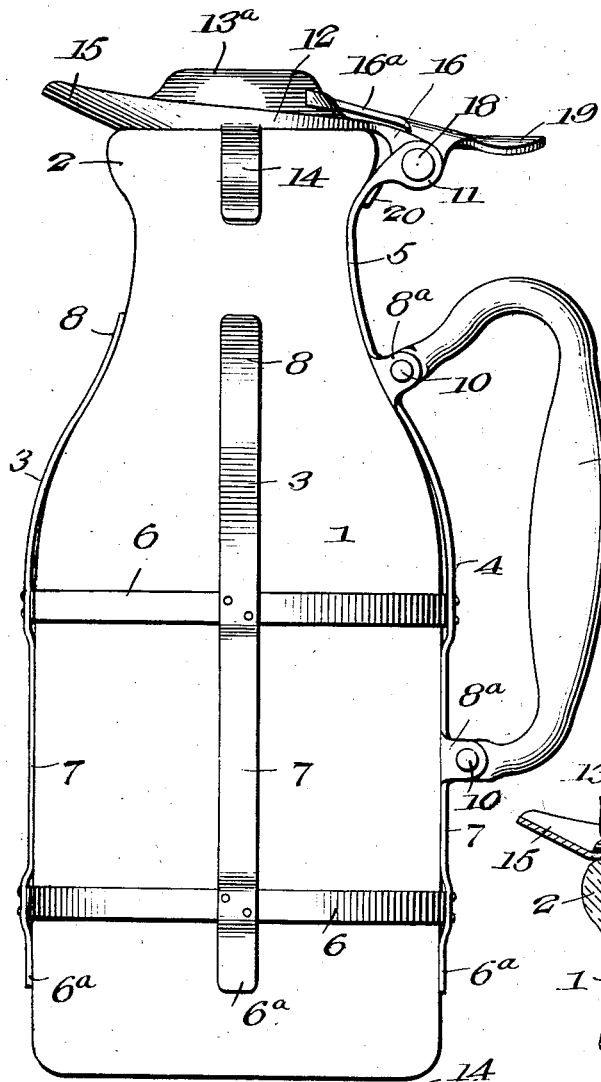
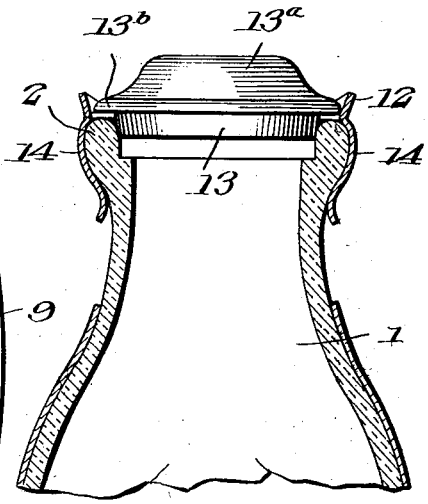
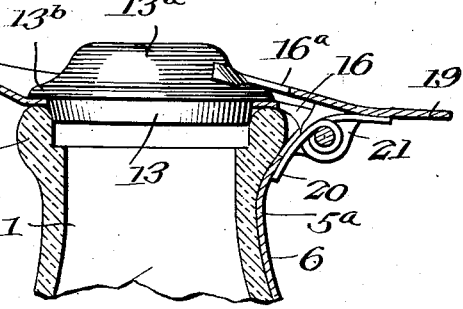
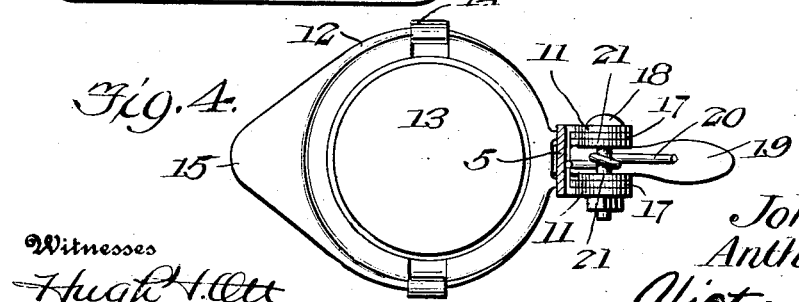
Inventors
John Amato
Anthony Parris
By Victor J. Evans
Attorney
Witnesses
Hugh H. Ott
J. W. Garner

UNITED STATES PATENT OFFICE.

JOHN AMATO AND ANTHONY PARRIS, OF SYRACUSE, NEW YORK.

BOTTLE COVER AND GRIP.

1,177,562.  Specification of Letters Patent.  Patented Mar. 28, 1916.

Application filed April 10, 1915. Serial No. 20,481.

*To all whom it may concern:*

Be it known that we, JOHN AMATO and ANTHONY PARRIS, citizens of the United States, residing at Syracuse, in the county of Onondaga and State of New York, have invented new and useful Improvements in Bottle Covers and Grips, of which the following is a specification.

Our invention is an improved bottle cover and grip for use on bottles, such for instance as milk bottles, to provide the bottle with a casing which enables the bottle to be readily handled, and also provide the bottle with a cover which effectually closes the same and which may be readily opened when desired.

The invention consists in the construction, combination and arrangement of devices hereinafter described and claimed.

In the accompanying drawings, Figure 1 is an elevation of a bottle provided with a grip casing and with a cover constructed in accordance with our invention. Figs. 2 and 3 are detail sectional views. Fig. 4 is an inverted plan of the cover and stopper.

For purposes of this specification a bottle such as a milk bottle is indicated at 1, provided with a bead 2 around the mouth. In accordance with our invention we provided a casing to inclose the bottle and enable the bottle to be readily handled. The casing comprises spring ribs 3 arranged a suitable distance apart and a spring rib 4 which is longer than the ribs 3 and has an upwardly extending arm 5. The ribs are connected together by cross bands 6 which extend around the casing. Each rib has an inturned lower portion $6^a$, an inturned or offset intermediate portion 7 and an inturned upper end 8. These inturned or offset portions of the ribs bearing directly against the bottle, the inturned lower portion 6 bearing near the bottom of the bottle and the inturned upper end 8 bearing around the neck of the bottle so that the casing serves to grip the bottle and hold the same firmly in the casing. The bottle is placed in the casing by moving the casing downwardly over the bottle, from the upper end of the latter, the spring ribs yielding to permit the passage of the casing downwardly on the bottle and serving when the casing is in place to grip the bottle and hold it firmly in the casing, as will be understood.

The rib 4 is provided at suitable points with outwardly extending pairs of lugs $8^a$ between which the upper and lower ends of a handle 9 are secured by means of screws 10 or other suitable devices. The extended upper arm 5 of said rib 4 is also provided with a pair of outwardly extended spaced lugs 11.

The cover 12 is formed with an opening which registers with the mouth of the bottle and on one side of the cover is a pouring spout 15 which is stamped integrally therewith. Opposite the pouring spout is an arm 16 which is formed with a pair of spaced lugs on its end which are arranged on the inner sides of the lugs 11 and are indicated at 17. The cover is also provided on opposite sides with a pair of inwardly and downwardly extending spring clip lugs 14 to engage under the bead 2 of the bottle and thereby securely lock the cover when in closed position.

In connection with a cover we also provide a stopper 13 to fit in the opening in the cover and to extend into and close the mouth of the bottle. The stopper is formed with a head $13^a$ the flange $13^b$ of which presses on the cover. An arm $16^a$ has a pair of lugs 21 that extend downwardly therefrom and are arranged on the inner sides of the lugs 17 of the cover. The said arm also has a handle 19 at its outer end. The inner end of the arm $16^a$ is forked and attached to the head $13^a$ of the stopper 13. A screw 18 passes through alined openings in the lugs 11, 17 and 21 and co-acts therewith to pivotally connect the stopper and the cover to the casing. The stopper may be opened at any time by pressing on the handle 19. A spring 20 is provided which serves to keep the stopper and hence also the cover normally in closed position as shown in Fig. 3.

Having thus described our invention we claim:—

1. A bottle grip comprising spaced spring ribs and bands connecting said ribs, one of said ribs having an upwardly extending arm, and a cover for the bottle pivotally mounted on said arm, said cover being also provided with spring clips to bear under the bead at the mouth of the bottle.

2. A bottle grip comprising spaced spring ribs and bands connecting said ribs, one of said ribs having an upwardly extending arm, and a cover for the bottle pivotally mounted on said arm, said cover being also provided with spring clips to bear under the bead at the mouth of the bottle, and a spring to normally keep the cover closed.

In testimony whereof we affix our signatures in presence of two witnesses.

JOHN AMATO.
ANTHONY PARRIS.

Witnesses:
JAMES FURCINITO,
LOUIS SPOSATE.